US006842962B1

(12) United States Patent
Blacket

(10) Patent No.: US 6,842,962 B1
(45) Date of Patent: Jan. 18, 2005

(54) SHEET JOINING METHOD AND APPARATUS AND A RIVET FOR USE IN THE METHOD

(75) Inventor: Stuart Edmund Blacket, Closeburn (AU)

(73) Assignee: Henrob Limited (GB)

( * ) Notice: Subject to any disclaimer, the term of this patent is extended or adjusted under 35 U.S.C. 154(b) by 0 days.

(21) Appl. No.: 09/509,302

(22) PCT Filed: Sep. 23, 1998

(86) PCT No.: PCT/GB98/02829

§ 371 (c)(1),
(2), (4) Date: Jun. 2, 2000

(87) PCT Pub. No.: WO99/15288

PCT Pub. Date: Apr. 1, 1999

(30) Foreign Application Priority Data

Sep. 23, 1997 (AU) .............................................. PO9355

(51) Int. Cl.[7] ................................................. B23P 11/00
(52) U.S. Cl. ..................... 29/509; 29/522.1; 29/525.06; 29/243.5; 72/391.2; 411/181; 411/500
(58) Field of Search ............................... 29/509, 522.1, 29/524.1, 529.06, 243.5, 243.53, 432.2, 798; 72/391.2, 397; 411/107, 179, 180, 501, 500, 181

(56) References Cited

U.S. PATENT DOCUMENTS

| 2,465,534 | A | * | 3/1949 | Havener | 29/524.1 |
|---|---|---|---|---|---|
| 4,106,180 | A | * | 8/1978 | Fuhrmeister | 29/524.1 |
| 4,615,475 | A | | 10/1986 | Fuhrmeister | |
| 4,858,289 | A | * | 8/1989 | Speller, Sr. | 29/243.53 |
| 5,042,137 | A | * | 8/1991 | Speller, Sr. | 29/524.1 |
| 5,051,020 | A | * | 9/1991 | Schleicher | 29/522.1 |
| 5,277,049 | A | * | 1/1994 | Endo | 72/391.4 |
| 5,305,517 | A | * | 4/1994 | Schleicher | 29/798 |
| 5,408,735 | A | * | 4/1995 | Schleicher | 29/432.2 |
| 5,722,144 | A | * | 3/1998 | Bora | 29/525.06 |
| 5,752,305 | A | | 5/1998 | Cotterill et al. | |
| 5,884,386 | A | * | 3/1999 | Blacket et al. | 29/522.1 |
| 6,385,843 | B1 | * | 5/2002 | Singh et al. | 29/798 |

FOREIGN PATENT DOCUMENTS

| DE | 2546214 A1 | * | 4/1977 | |
| DE | 004419065 A1 | * | 12/1995 | |
| WO | WO 9535174 A1 | * | 12/1995 | B21J/15/02 |

* cited by examiner

Primary Examiner—David P. Bryant
Assistant Examiner—Jermie E. Cozart
(74) Attorney, Agent, or Firm—Piper Rudnick LLP

(57) ABSTRACT

A method and apparatus for joining together two or more superimposed generally planar sheets by setting a fastener in engagement with the sheets at a predetermined location. The sheets are superimposed and placed in a fastener setting and sheet deforming assembly. The assembly is then operated to set a fastener into the sheet and to deform the sheets out of their planes around the predetermined locations. The sheets may be deformed before the fastener is set, after the fastener is set, or simultaneously with setting of the fastener. Sheet deformation may be achieved using appropriate clamping arrangements or by providing recesses into which the sheets are deformed during the course of rivet insertion. The invention also relates to a rivet for use in the method.

19 Claims, 3 Drawing Sheets

US 6,842,962 B1

SHEET JOINING METHOD AND APPARATUS AND A RIVET FOR USE IN THE METHOD

TECHNICAL FIELD OF THE INVENTION

This invention relates to an improved sheet joining method and apparatus.

BACKGROUND OF THE INVENTION

When joining two thin metal sheets together with, e.g. rivets, there is often difficulty in achieving sufficient shear load strength. It is believed that the shear load strength can be increased by the order of 15% when a blind rivet is applied in a known manner to pre-dimpled sheets, that is sheets in which dimples have been pressed around holes formed to receive blind rivets. In many applications however it is not practical to press dimples into sheets before they are secured together.

It is an object of the present invention to provide a joining method and apparatus capable of providing increased joint shear load strength.

SUMMARY OF THE INVENTION

According to the present invention, there is provided a method for joining together two or more superimposed generally planar sheets by setting a fastener in engagement with the sheets at a predetermined location, wherein the superimposed planar sheets are placed in a fastener setting and a sheet deforming assembly, and the assembly is operated to set a fastener into the sheet and to deform the sheets out of their planes around the predetermined location.

The term "fastener" is used herein to include rivets, screws and the like.

The invention also provides an apparatus for carrying out the above method.

The invention further provides an apparatus for joining together two or more superimposed generally planar sheets by setting a fastener in engagement with the sheets at a predetermined location, the apparatus comprising an assembly which is operative to receive superimposed planar sheets and to set a fastener in engagement with the sheets and to deform the sheets around the predetermined location out of their planes either before, during or after fastener setting.

The invention further provides a rivet for use in accordance with the above mentioned method, comprising a head the thickness of which increases in the radially outwards direction to define a convex surface beneath the head.

The invention further provides a method for joining two or more sheet materials with a fastener, wherein the sheet materials are deformed by a die to form an annular deformation engaged between a head and a free end of a stem or shank of the fastener.

The deformation may comprise an annular projection or groove, or a ridge, or a plurality of dimples.

The sheets may be deformed before the fastener is set, for example by clamping the sheets together before the fastener is set. The sheets may be clamped together until the fastener has been set, or unclamped before the fastener is set. In one embodiment, the sheets are clamped together between a clamping member and a die shaped such that the sheets are deformed between the clamping member and the die. The sheets may be supported around the predetermined location by a support surface defining a recess into which the sheets are deformed by a head portion of the fastener.

Alternatively, the sheets may be deformed after the fastener is set, for example by clamping the sheets to be deformed between a clamping member and a die shaped such that the sheets are deformed between the clamping member and the die.

In a further alternative method, the sheets may be deformed and the fastener may be set simultaneously. For example, the sheets may be deformed by supporting the sheets on a die defining a recess extending around the predetermined location, a head portion of the fastener driving the sheets into the recess when the fastener is set. The sheets may be clamped against the surface of the die outside the said recess during the setting of the fastener. The fastener head may increase in thickness towards its periphery so as to define a convex surface facing the die and matching the shape of the recess formed in the die.

BRIEF DESCRIPTION OF THE DRAWINGS

To enable the invention to be fully understood, a number of preferred embodiments will now be described with reference to the accompanying drawings, in which.

DETAILED DESCRIPTION OF THE INVENTION

Figure 1:
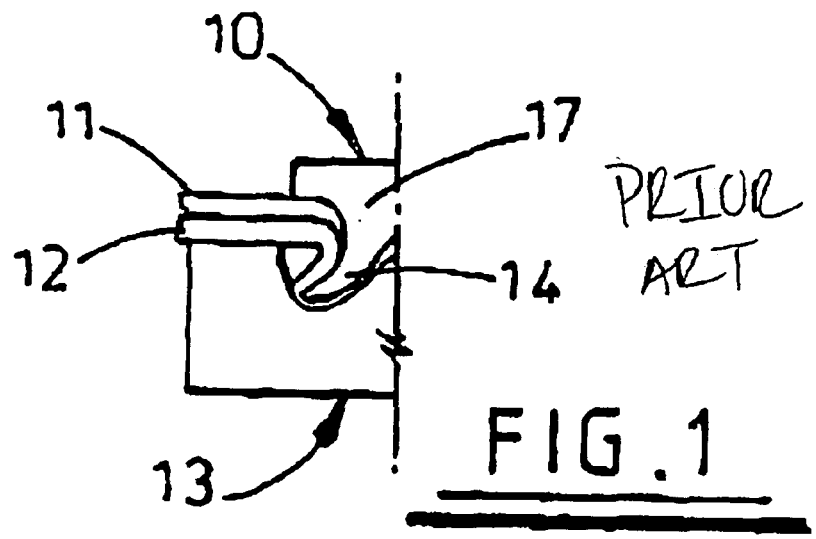
FIG. 1 is a sectional side view showing the joining of two metal sheets using a standard semi-tubular rivet and die in a conventional manner.

As shown in FIG. 1, in a conventional method of joining metal sheets 11, 12 with a semi-tubular rivet 10, a punch (not shown) forces the rivet and metal sheets 11, 12 into a die 13 and the deformation of the metal sheet and of the shank 14 of the rivet locks the metal sheets together.

Figure 2:
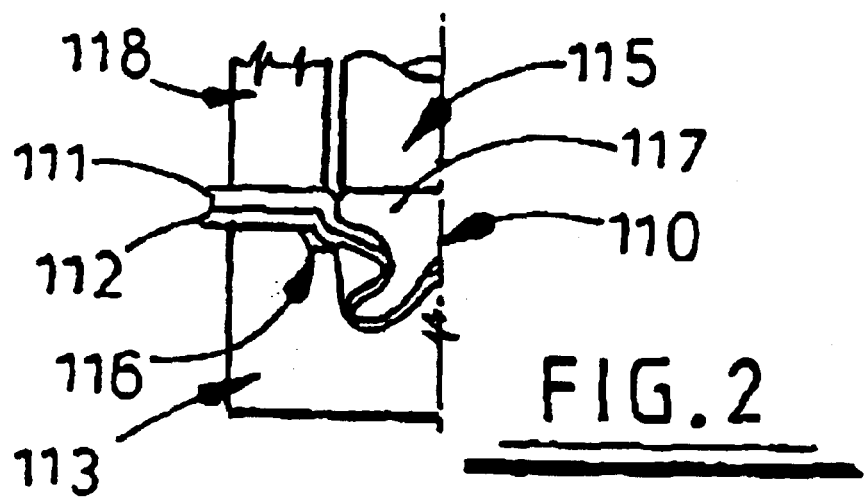
FIG. 2 is a similar view to that of FIG. 1 showing the joining of two sheets in accordance with a first embodiment of the present invention using a standard semi-tubular rivet and a recessed die.

To improve the shear strength, as shown in FIG. 2 and in accordance with the present invention, a rivet 110 and metal sheets 111 and 112 may be driven by a punch 115 into a die 113 where the metal sheets are deformed from the planes in which they initially lie into an annular recess 116 to form a counter-sink around a rivet head 117. The metal sheets are clamped to the die 113 by a pre-clamping head 118, that is the head 118 is applied against the sheets 111, 112 before and during rivet insertion. The sheets are deformed simultaneously with setting of the rivet.

Figure 3:
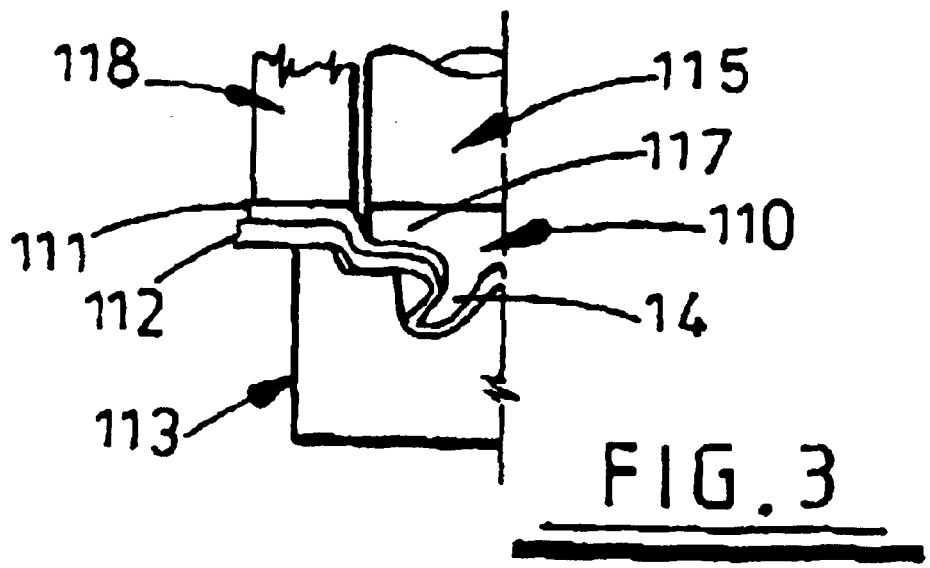
FIG. 3 is a similar view to that of FIG. 1 showing the joining of two sheets in accordance with a second embodiment of the present invention using a large headed rivet and a recessed die.

A similar method to that of FIG. 2 may be employed for large headed rivets as shown in FIG. 3.

Figure 4:
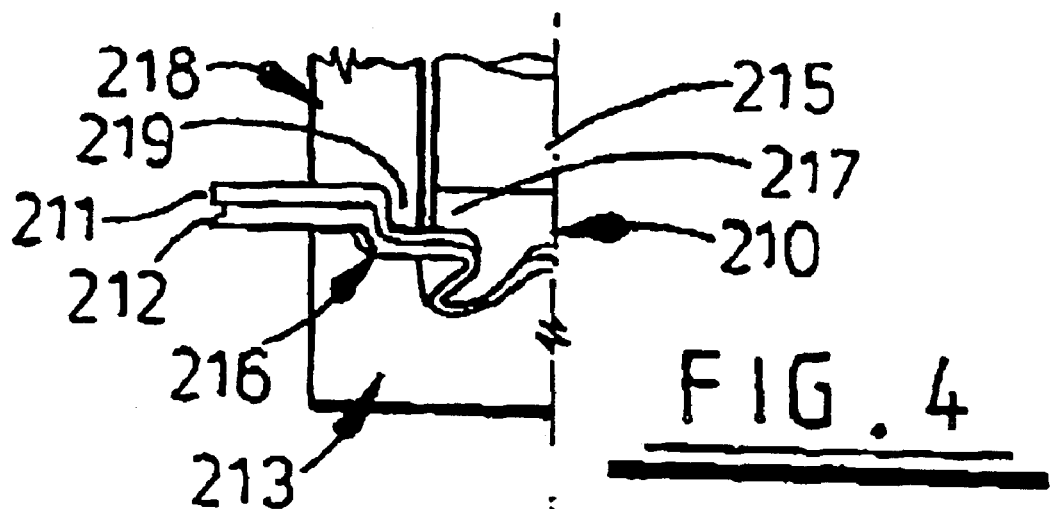
FIG. 4 is a sectional side view showing the joining of two sheets where the material around the rivet head is "coined" or deformed in accordance with a third embodiment of the present invention.

Referring now to FIG. 4, a die 213 defines a wider annular recess 216 and a pre-clamping head 218 has a nose 219 which deforms metal sheets 211, 212 into the recess to form an annular deformation about a head 217 of a rivet 210, i.e. the metal sheets 211, 212 are "coined" around the rivet head 217. The pre-clamping force is sufficient to prevent relative movement between the adjacent sheets, and may be for example of the order of 1 tonne. The sheets are deformed into the recess 216 before the rivet is set. Alternatively, the "coining" of the metal sheets 211, 212 may be effected by using the head 218 to engage the metal sheets only after the rivet 210 has been set, such that the sheets 211, 212 are fully deformed into the recess 216 after the rivet is set.

Figure 5:
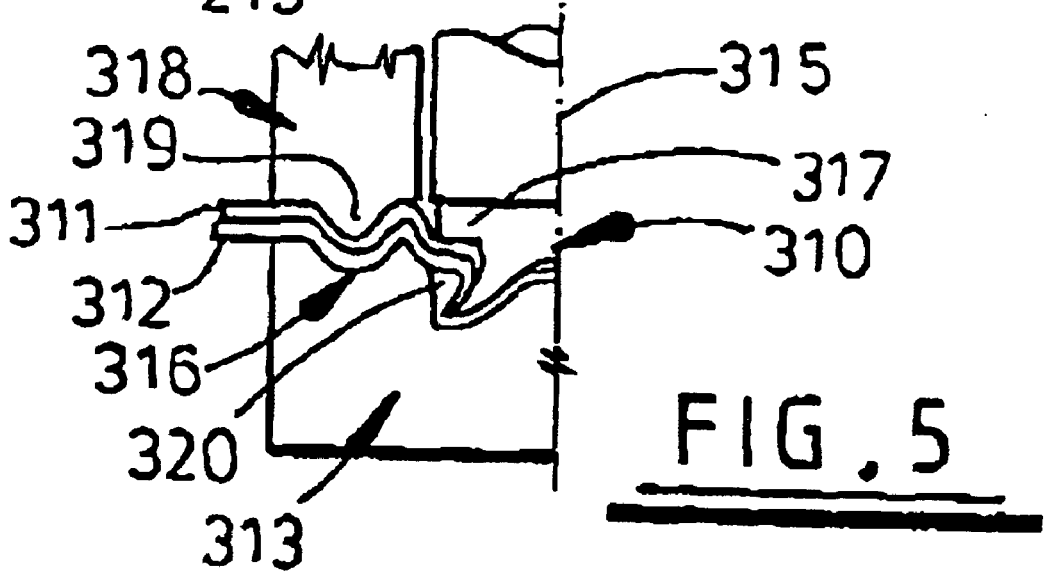
FIG. 5 is a similar view to that of FIG. 4 showing the formation of a rib around a rivet head in accordance with a fourth embodiment of the present invention.

In the embodiment of FIG. 5, a die 313 has an annular recess 316 spaced from a bore 320 of the die. A clamping had 318 supports a projection 318 which deforms metal sheets 311, 312 into a recess 316 to form a flush ribbing effect around a head 317 of a rivet 310 which is driven in by a punch 315. The clamping head 318 may be pressed against the metal sheets either before the rivet is driven in, after the rivet is driven in, or before and during the driving in of the rivet. This will increase the shear load strength and stiffness of the joint.

Figure 6:
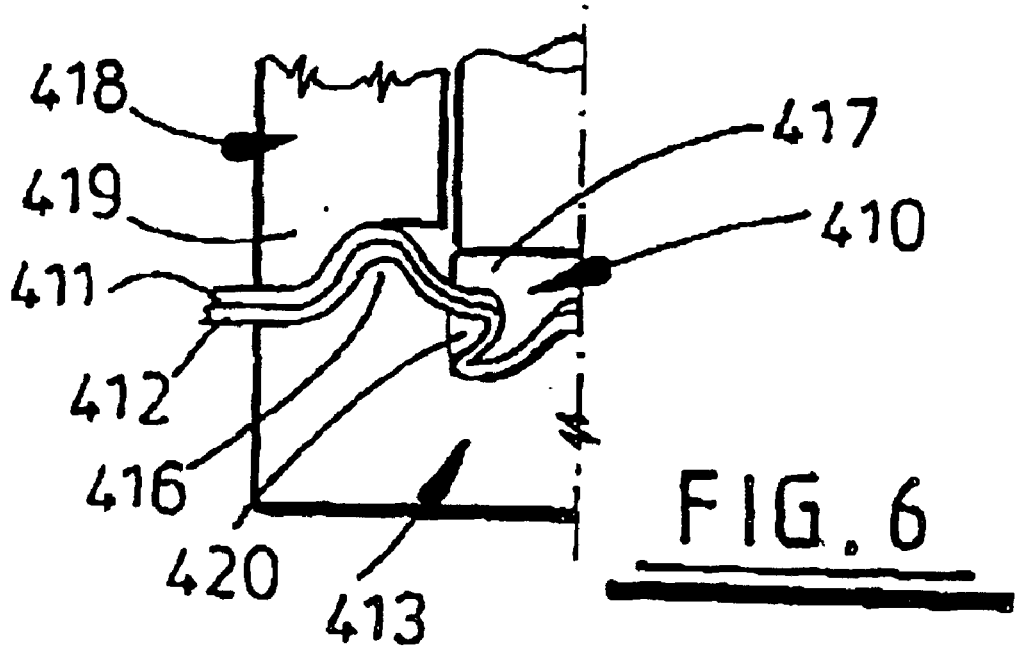
FIG. 6 shows the formation of a rib around a rivet head in accordance with a fifth embodiment of the present invention.

In the embodiment of FIG. 6, metal sheets 411 and 412 are again formed to provide a raised annular rib about the head 417 of the rivet 410 where the die 413 has an annular protrusion (or ridge) 416 about the bore 420 of the die. The ribbing effect may be generated by a nose portion 419 which is complementary with the recess 416 on a clamping head 418. Once again, the clamping head 418 may be applied to the sheets 411, 412 before, after or during rivet setting.

Figure 7:
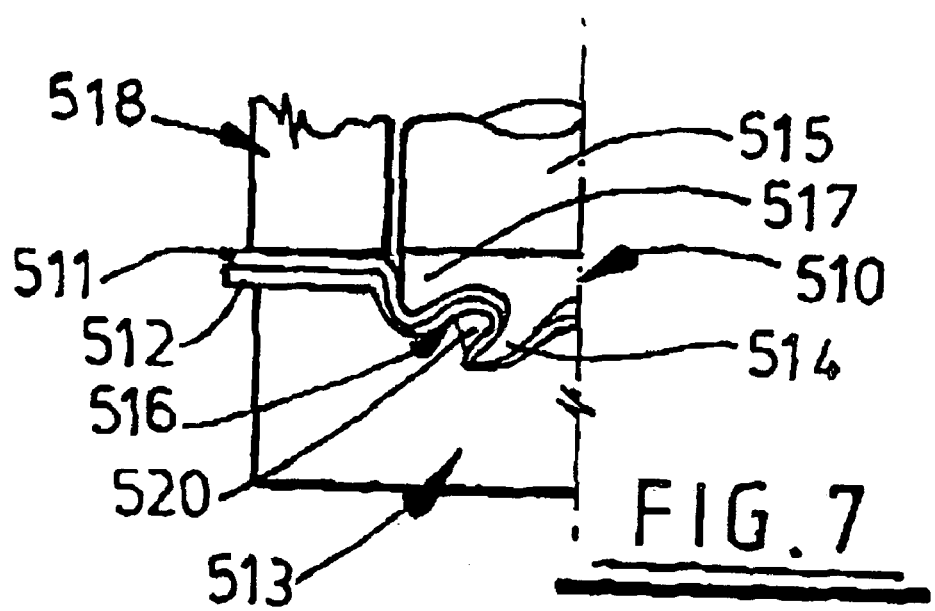
FIG. 7 shows the formation of a "coined" deformation under a rivet head in accordance with a sixth embodiment of the present invention.

Referring now to FIG. 7, a die 513 has an inwardly-directed shoulder 516 in a bore 520. As a rivet 510 is set to join metal sheets 511, 512, the sheets are deformed inwardly to form an annular coining ring between a head 517 of the rivet and a shank 514 of the rivet 510. In this embodiment, the metal sheets 511, 512 are clamped to the die 513 by a clamping head 518 before a punch 515 is advanced to engage the rivet 510. Sheet deformation occurs simultaneously with rivet insertion.

As an alternative to continuous deformation about the rivet head, the metal sheets may be deformed into a series of "dimples" about the rivet head. Dimples may be of two different types, that is where a top sheet is sheared so as to be in effect cut, and where the top sheet is pressed into an adjacent sheet but is not cut.

Figure 8:
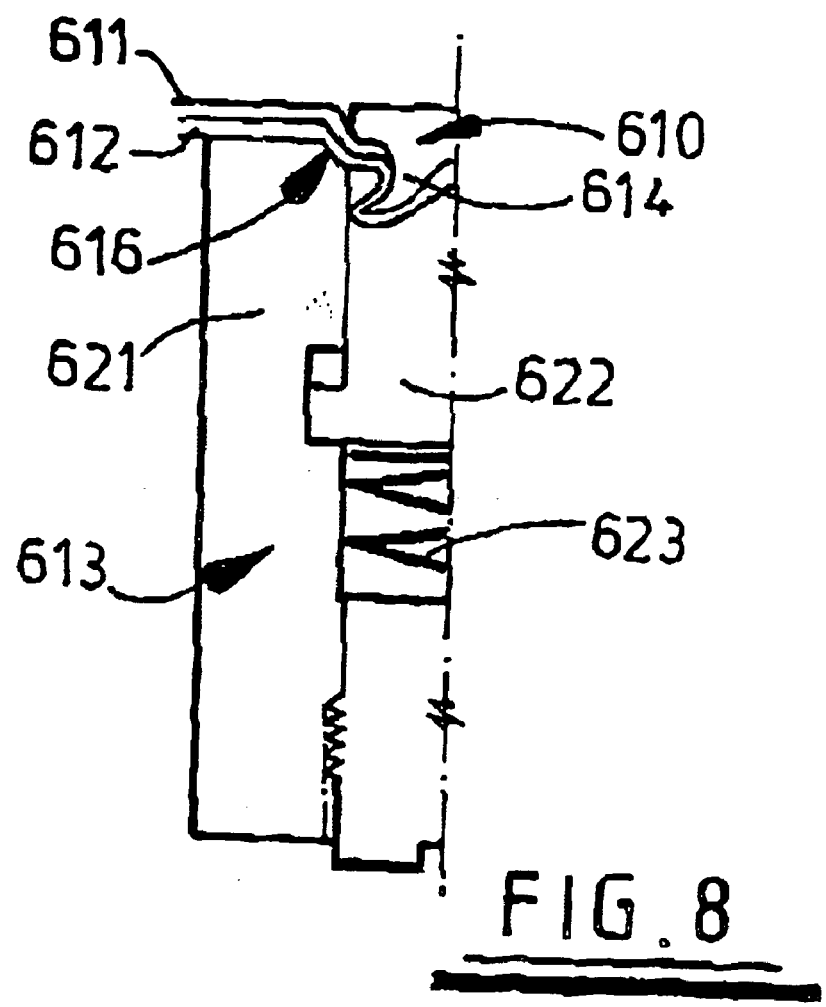
FIG. 8 is a sectional side view of a spring-loaded upsetting die suitable for use in accordance with the present invention.

Referring now to FIG. 8, a die 613 has a fixed outer annular body 621 and an inner core 622 urged upwardly by a spring 623. The die 613 reduces the tendency to cracking of metal sheets 611, 612 as the sheets will initially be coined into a recess 616 before the deformation of the metal sheets 611, 612 by a shank 614 of a rivet 610 occurs, i.e. the deformation of the metal occurs in stages. Sheet deformation occurs primarily after rivet setting.

It is believed that the formation of deformations around a fastener such as a rivet in accordance with the present invention can increase the peel strength of a joint by of the order of 10% as well as producing significant improvements in shear strength and repeatability.

Deformation of sheets to be joined before a rivet is set not only improves joint strength but can in addition ensure that the following process of self-piercing riveting is fully isolated from any effects or reaction from the sheets surrounding the location at which the rivet is to be set. Thus whereas pre-clamping of sheets before self-piercing riveting improves joint quality as described for example in U.S. Pat. No. 5,752,305, pre-deformation of the sheets around the site of the rivet can provide further improvements in joint quality and in particular can reduce the standard deviation of self-pierce riveted joint performance. This can be particularly important where it is difficult by simple pre-clamping of the sheets together to avoid effects from the surrounding sheets and prevents relative movements, for example when the sheets have surfaces treated with a lubricant or grease, for example when joining aluminum sheets carrying dry film die lubricant coatings.

Although it is believed desirable to pre-deform the sheets around the rivet site and to maintain a high clamping force on the sheets during rivet insertion to achieve very high quality joints, in some circumstances it is possible to release the pre-clamping force after deformation but before the rivet is driven in. The use of such a method can have advantages in particular situations as the overall assembly which supports the die against which the sheets to be riveted are clamped need not be as robust. If the clamping force is maintained during rivet insertion, the assembly must support the sum of the pre-clamping and rivet insertion forces. If the clamping force is relieved during rivet insertion, the overall assembly need only be sufficiently robust to support the larger of these two forces.

The forces necessary to deform the sheets and drive in self-piercing rivets will to an extent be a function of the physical characteristics of the sheets to be joined. With relatively thick sheets, or sheets which resist deformation, it may be necessary to use relatively high kinetic forces to achieve the necessary performance. With relatively thin sheets, or sheets which can be relatively easily deformed, the necessary pre-clamping forces may be achieved with low velocity components driven by for example hydraulic actuators.

What is claimed is:

1. A method for joining together two or more superimposed generally planar sheets using a fastener having a shank and a fastener setting and sheet deforming assembly comprising a die with a cavity and an annular recess immediately adjacent to said cavity, comprising the steps of:
   placing the superimposed planar sheets in the fastener setting and sheet deforming assembly, one or more planes defined by interfaces between the superimposed planar sheets; and
   operating the assembly to set the fastener into engagement with the sheets such that the shank of the fastener is upset in said die cavity without penetration of the lowermost sheet of the superimposed generally planar sheets, and to deform all the sheets out of the one or more interface planes into the annular recess of the die.

2. A method according to claim 1, wherein the sheets are deformed before the fastener is set.

3. A method according to claim 2, wherein the sheets are clamped together until the fastener has been set.

4. A method according to claim 3, wherein the sheets are clamped together until the fastener has been set.

5. A method according to claim 4 wherein the sheets are deformed by a head portion of the fastener.

6. A method according to claim 3 wherein the sheets are deformed by a head portion of the fastener.

7. A method according to claim 2, wherein the sheets are unclamped before the fastener is set.

8. A method according to claim 3, 4 or 7 wherein the sheets are clamped together between a clamping member and the die, the sheets being deformed between the clamping member and the die.

9. A method according to claim 8 wherein the sheets are deformed by a head portion of the fastener.

10. A method according to claim 7 wherein the sheets are deformed by a head portion of the fastener.

11. A method according to claim 2 wherein the sheets are deformed by a head portion of the fastener.

12. A method according to claim 1, wherein the sheets are deformed after the fastener is set.

13. A method according to claim 12, wherein the sheets to be deformed are clamped between a clamping member and the die, the sheets being deformed between the clamping member and the die.

14. A method according to claim 1, wherein the sheets are deformed and the fastener is set simultaneously.

15. A method according to claim 14, wherein the sheets are deformed by a head portion of the fastener driving the sheets into the recess when the fastener is set.

16. A method according to claim 15, wherein the sheets are clamped against a surface of the die outside the recess during the setting of the fastener.

17. A method according to claim 15 or 16, wherein the fastener head has a periphery, the fastener head increases in thickness toward the periphery so as to define a convex surface facing the recess formed in the die.

18. A method according to claim 1, wherein the fastener is a rivet comprising a head, the thickness of which increases continually in a radially outwards direction to define a convex surface beneath the head.

19. An apparatus for joining together two or more superimposed generally planar sheets with a fastener having a shank, the apparatus comprising:
  a fastener setting and sheet deforming assembly comprising a die,
  a cavity in said die and
  an annular recess immediately adjacent to said cavity,
  the apparatus being operative to receive the sheets, to set said fastener into engagement with the sheets such that the shank of the fastener is upset in said die cavity without penetration of at least the lowermost sheet of the superimposed planar sheets and to deform all the sheets out of one or more planes defined by interfaces between the superimposed sheets into the annular recess of the die.

* * * * *